(No Model.)
D. B. N. TURNER.
PLANTER.
No. 379,834. Patented Mar. 20, 1888.
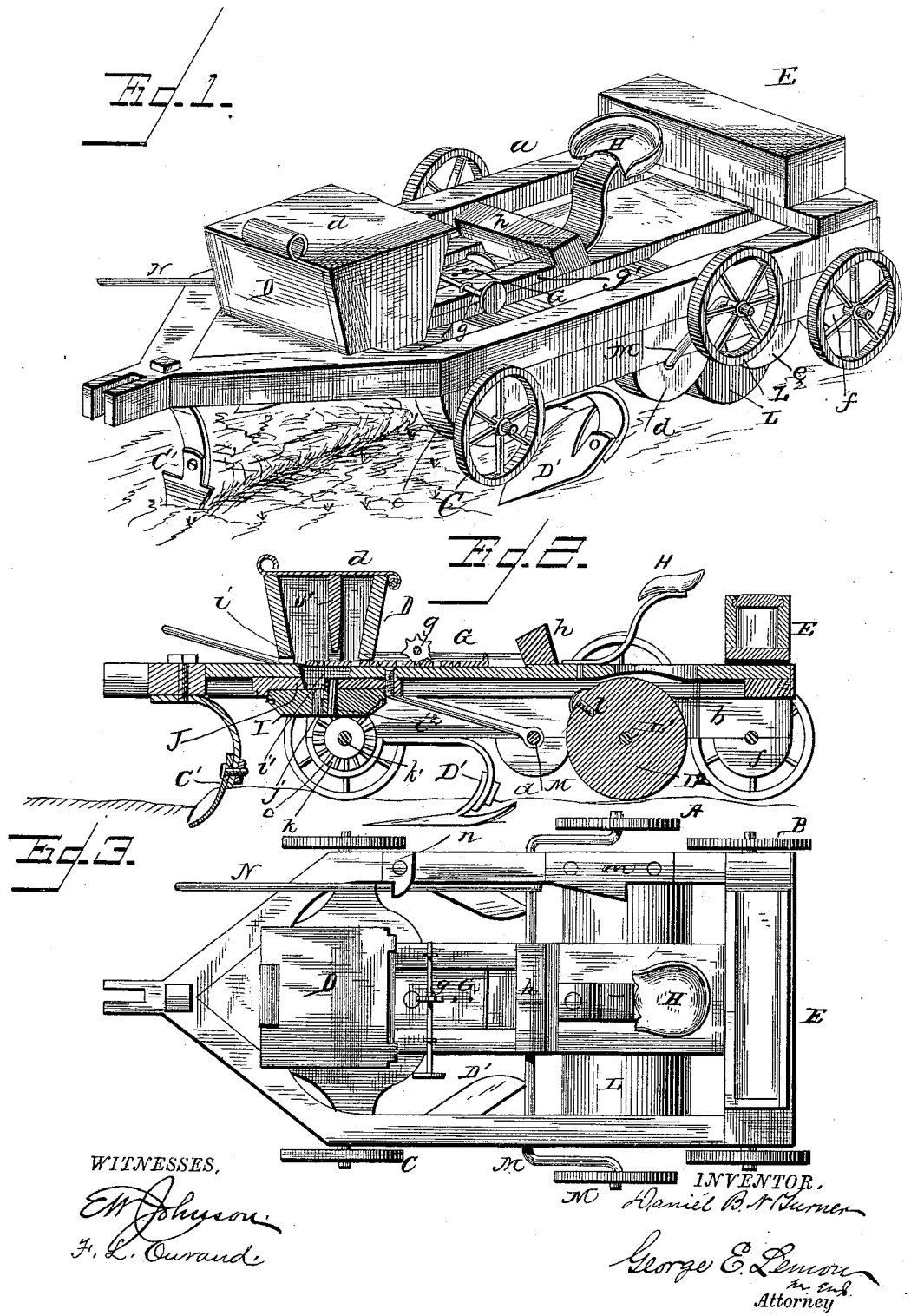
WITNESSES.
E. W. Johnson.
F. L. Ourand.
INVENTOR.
Daniel B. N. Turner
George E. Lemon
Attorney

UNITED STATES PATENT OFFICE.

DANIEL B. N. TURNER, OF EARLE'S, KENTUCKY.

PLANTER.

SPECIFICATION forming part of Letters Patent No. 379,834, dated March 20, 1888.

Application filed May 14, 1885. Serial No. 165,476. (No model.)

*To all whom it may concern:*

Be it known that I, DANIEL B. N. TURNER, a citizen of the United States of America, residing at Earle's, in the county of Muhlenburg and State of Kentucky, have invented certain new and useful Improvements in Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in planters, the same being designed to plant corn or other seeds in hills, or to prepare the ground, or place fertilizing material on the same and mark said ground for the reception of such plants as tobacco; and my invention consists in the construction and combination of the parts, as will be hereinafter fully set forth, and specifically pointed out in the claim.

In the accompanying drawings, which illustrate my invention, Figure 1 is a perspective view of my improvement. Fig. 2 is a sectional view, and Fig. 3 is a plan view.

A represents a suitably-constructed frame, which is provided with parallel side pieces, which converge toward each other at the forward end of the machine, at which point the whiffletree is attached. To the under sides of the parallel side pieces are secured strips $b$, which are provided with bearing-blocks $c$, $d$, $e$, and $f$. To the upper edge of the parallel side pieces of the frame is attached a cross bar or beam, which carries a box, E, which is provided with a sliding cover, said box being adapted to carry either tools or other articles. Under the beam which supports the box E is attached one end of a longitudinal strip, F, which is securely attached to the frame, and serves as a support at its forward end for the seed-box D, which seed-box is provided with a vertical transverse partition, D′, which divides the same into two compartments. The lower edge of the rear wall of the said box is cut away, so that a slide, G, may pass under the same. This slide at its inner end is provided with perforations, which are arranged so that the seed and fertilizing material may be fed in simultaneously, or the supply cut off entirely from either of the compartments by bringing the forward unperforated end of the slide beneath either or both of said compartments. The rear end of the slide G has formed thereon a rack, with which engages a spur-wheel, $g$, which is attached to a transverse rod or shaft journaled in blocks $g'$, located on the beam F, adjacent to the box D. The said shaft is provided in one of its projecting ends with a hand-wheel for rotating the same. The beam F also carries between the seed-box D and the tool-box E a seat, H, and a foot-board, $h$. An opening, $i'$, is so formed in the board F as to register with the open bottom of the box D, and beneath said board is secured a cross-piece, J, which has a central recess or depression, in which bears a horizontal bevel gear-wheel, I, turning upon a pivot, $i''$, which depends from the center of the depressed portion of the cross-piece J. The said wheel I is provided with a vertical opening, $j$, which, as said wheel is rotated, comes intermittently below the opening $i'$.

The wheel I is actuated by a bevel gear-pinion, $k$, mounted on the forward axle, $k'$, of the machine, which axle is supported and bears in the blocks $c$, and has the forward supporting-wheels, C, rigidly mounted on its ends.

From the description already furnished it will be apparent that the pinion $g$ can be rotated by hand to move the slide G, so that the latter will cut off either or both of the feeds from the chambers in the box D, and that the said slide can be so adjusted as to permit the combined feed from both chambers, the material passing down by gravity into the opening $i'$, from whence it is intermittently withdrawn by the opening $j$ of the wheel I coming rapidly beneath the same, and thereby enabling the material to be dropped intermittently, as is required in hill-planting. A shovel-plow, C′, which is attached to the forward central portion of the frame, opens a furrow, into which the material may be dropped.

B B refer to the rear carrying-wheels, which are mounted on the ends of the rear axle, which is supported and bears in the blocks $ff$.

To the outer sides of the bars $a$ $a$ of the frame are attached plows D′, the shovels of which are arranged so as to throw the earth toward the center of the machine to cover the furrow.

In front of the rear axle is located a roller, L, which is mounted rigidly on a shaft, L', the ends of which bear loosely in the blocks e. The said roller L has attached to its central portion a projecting knob, l, which serves as a marker, and said marker is adapted to register or contact with the ground at the points where the seed is deposited.

M refers to a shaft which bears in the blocks d, and has its ends projecting beyond said blocks and bent to form crank-axles for wheels A A, and said shaft M has attached adjacent to one side of the frame a lever, N, which is adapted to be thrown either forward, as shown, to engage and be held by the catch-plate n, secured on the adjacent bar a, or rearward, so as to engage and be held by the catch-plate m, also secured on the same adjacent bar.

In preparing the ground for the reception of plants the operation is as follows: Suitable fertilizing material is placed in one of the compartments of the box D and the marker L adjusted so that the knob therein will contact with the earth at the exact spot where the fertilizing material falls, and as the machine is drawn over the ground the central furrow will be opened, fertilizing material deposited therein at intervals, said fertilizing material being covered by the plows, and the ground rolled by the cylinder L and laid off by the knob l upon the same. When it is desired to turn the machine or transfer the same without the shovels contacting with the earth, the lever N is raised and pressed rearward into engagement with the catch-plate m, which will hold said lever in position, the wheels A being depressed, so as to raise the entire machine out of operative position with respect to the soil.

In planting corn the seed may be placed in one compartment of the hopper and the fertilizing material in the other, the land being laid off by a grooved roller, instead of employing the roller L. The wheel I is rotated on its pivot from the motion of the front axle, and this causes the opening in said wheel to intermittently come below the opening in the box D and cross-bar J, so that the seed and fertilizing material are dropped at proper intervals.

I claim—

The combination, with the forward portion of the frame carrying a partitioned seed-box, D, and an under apertured feed-block forming a space between the upper surface thereof and the under surface of the feed-box, of two strips, g', in the rear of the feed-box, to form a depression or recess between the same, a slide-plate, G, having a series of apertures therein, and a hand-operated shaft mounted on the strips g', and carrying a centrally-situated pinion, g, which is adapted to engage the apertures in the slide-plate G, to operate the same, substantially as described.

In testimony whereof I affix my signature in presence of two witnesses.

DANIEL B. N. TURNER.

Witnesses:
   THOS. C. SUMMERS,
   C. M. SPARKS.